US008224592B2

(12) United States Patent
De Cristofaro et al.

(10) Patent No.: US 8,224,592 B2
(45) Date of Patent: Jul. 17, 2012

(54) METHOD AND DEVICE FOR ESTIMATING THE INTAKE AIR FLOW RATE IN AN INTERNAL COMBUSTION ENGINE

(75) Inventors: Ferdinando De Cristofaro, Turin (IT); Alessandro Riegel, Turin (IT); Domenico Tavella, Turin (IT)

(73) Assignee: Fiat Group Automobiles S.P.A. (IT)

( * ) Notice: Subject to any disclaimer, the term of this patent is extended or adjusted under 35 U.S.C. 154(b) by 527 days.

(21) Appl. No.: 12/260,406

(22) Filed: Oct. 29, 2008

(65) Prior Publication Data

US 2009/0143998 A1 Jun. 4, 2009

(30) Foreign Application Priority Data

Oct. 31, 2007 (EP) .................................... 07425688

(51) Int. Cl.
*G01F 1/00* (2006.01)

(52) U.S. Cl. ........................................................ 702/45

(58) Field of Classification Search .................... 702/45, 702/47, 50

See application file for complete search history.

(56) References Cited

U.S. PATENT DOCUMENTS 6,591,667 B1 7/2003 Kotwicki et al. ............ 73/118.1
7,565,236 B2 * 7/2009 Turin et al. .................... 701/103
2003/0182995 A1 10/2003 Rouphael ...................... 73/118.1
2006/0277984 A1 12/2006 Bleile et al. .................. 73/118.2

FOREIGN PATENT DOCUMENTS

EP 0 287 932 10/1988
WO WO 02/068806 9/2002

OTHER PUBLICATIONS

European Search Report mailed Apr. 11, 2008 in corresponding European Application No. 07425688.4.
Pierre Bidan et al. "Nonlinear Control of a Spark-Ignition Engine," IEEE Transactions on Control Systems Technology, New York, U.S., vol. 3, No. 1, Mar. 1995, pp. 4-13.
A. G. Stefanopoulou et al. "Engine Air-Fuel Ratio and Torque Control using Secondary Throttles," Proceedings of the 33rd IEEE Conference on Decision and Control, Orlando, U.S.A., Dec. 1994, pp. 2748-2753.

* cited by examiner

*Primary Examiner* — Drew A Dunn
*Assistant Examiner* — Stephen Cherry
(74) *Attorney, Agent, or Firm* — Ostrolenk Faber LLP

(57) ABSTRACT

A method is described for estimating the intake air flow rate in an internal combustion engine provided with an air intake system, wherein said system comprises valve means for controlling an intake air flow rate, characterized in that it comprises the phases of implementing a first and a second algorithm, suitable to determine respectively a first and a second engine intake air flow rate; and of selecting the first or the second flow rate, on the basis of a previously defined selection criterion.

13 Claims, 2 Drawing Sheets

METHOD AND DEVICE FOR ESTIMATING THE INTAKE AIR FLOW RATE IN AN INTERNAL COMBUSTION ENGINE

The present invention relates to a method and a device for estimating the intake air flow rate in an internal combustion engine.

BACKGROUND OF THE INVENTION

As known in the prior art, in order to comply with mandatory pollutant emission limits, in new-generation vehicles, and in particular motor vehicles provided with a modern indirect injection petrol engine with three-way catalyst, the air-fuel ratio must be precisely controlled so that it is always close to the stoichiometric value, in order to reduce exhaust gas emissions.

For that purpose, modern motor vehicles are generally provided with an airflow meter (debimeter) which is usually installed in the air intake system of the engine and provides an electric signal indicative of the flow rate of the fresh air supplied to the engine, on the basis of which the electronic control unit calculates the fuel flow rate to be injected into the engine cylinders before opening the intake valves, also as a function of the desired air-fuel ratio.

Alternatively, new-generation vehicles are known which are provided with an electronic control unit that, among other functions, implements an algorithm to estimate the intake air flow rate in the engine.

In particular, controlling the air-fuel ratio precisely at close to the stoichiometric value is particularly difficult in new-generation motor vehicles provided with a continuously variable intake timing system.

In this type of engine, measuring or precisely estimating the instantaneous mass of air flowing into the cylinders is particularly complicated, mainly owing to the natural supercharging effect that occurs in such engines due to the timing of the pressure waves in the intake manifold when the intake valve is opened.

In particular, when an airflow meter is used in an engine with a variable timing system, the air mass flowing into the cylinders cannot be measured precisely, due to the slow dynamics of the airflow meter, which is therefore unable to react to the extremely non-linear dynamics of the air passing through the intake conduit, characterized, even in normal driving conditions, by fast transients.

Research conducted by the applicant has also demonstrated that even when the known algorithms are used it is not possible to obtain a precise estimation of the mass of air entering variable timing engines. In fact, such algorithms do not consider the positive displacement pump effect of the engine at changes in speed, which have a marked influence on the intake air mass flow rate, especially in high pressure areas, for instance with pressure ratios at the throttle valve in the region of 0.9-0.95, or any mechanical timing errors, or any sudden changes in the intake timing, nor are they capable of correctly reproducing transitions between torque law and mechanical law in the status of the Drive-by-Wire control system.

SUMMARY OF THE INVENTION

The purpose of the present invention is to provide a method for estimating the intake air flow rate in an internal combustion engine that at least partially overcomes the drawbacks of the devices and methods known in the prior art.

According to the present invention a method for estimating the intake air flow rate in an internal combustion engine is produced, as set forth in the attached claims.

BRIEF DESCRIPTION OF THE DRAWINGS

In order to better understand the present invention, a non-limiting preferred embodiment thereof will now be described by way of example with reference to the accompanying drawings, in which.

DETAILED DESCRIPTION OF THE INVENTION

Figure 1:
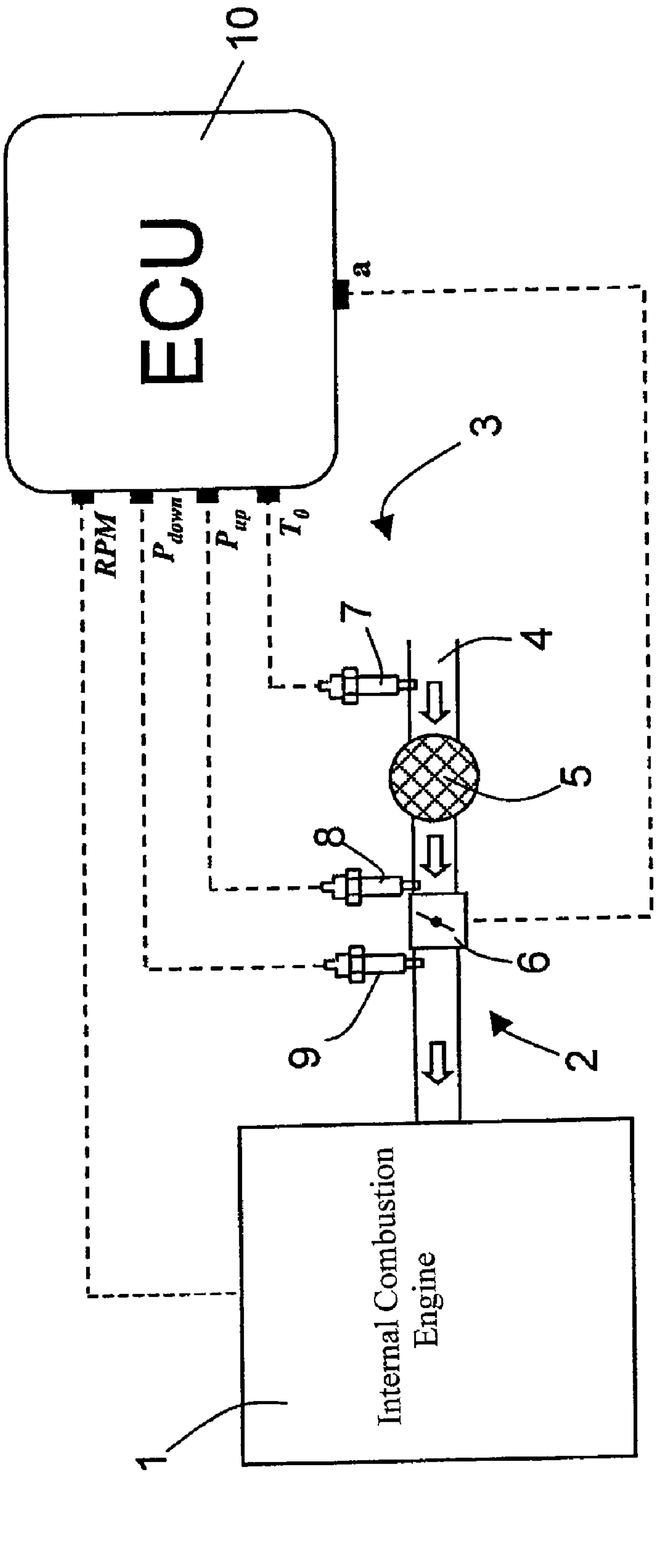
FIG. 1 is a schematic view of an air intake system of an internal combustion engine.

In FIG. 1, number 1 indicates, as a whole, an internal combustion engine provided with an air intake system 2 and an electronic system 3 for controlling the intake system 2.

In particular, the air intake system 2 comprises an air intake conduit 4, into which the air flows through an air filter 5, and a throttle valve 6 arranged on the air intake conduit 4, which supplies the intake air to the cylinders of the engine 1 (not illustrated in the drawing).

In particular, the throttle valve 6 is operated by means of a specific actuating device, for example a direct current electric motor (not illustrated in the drawing).

Figure 2:
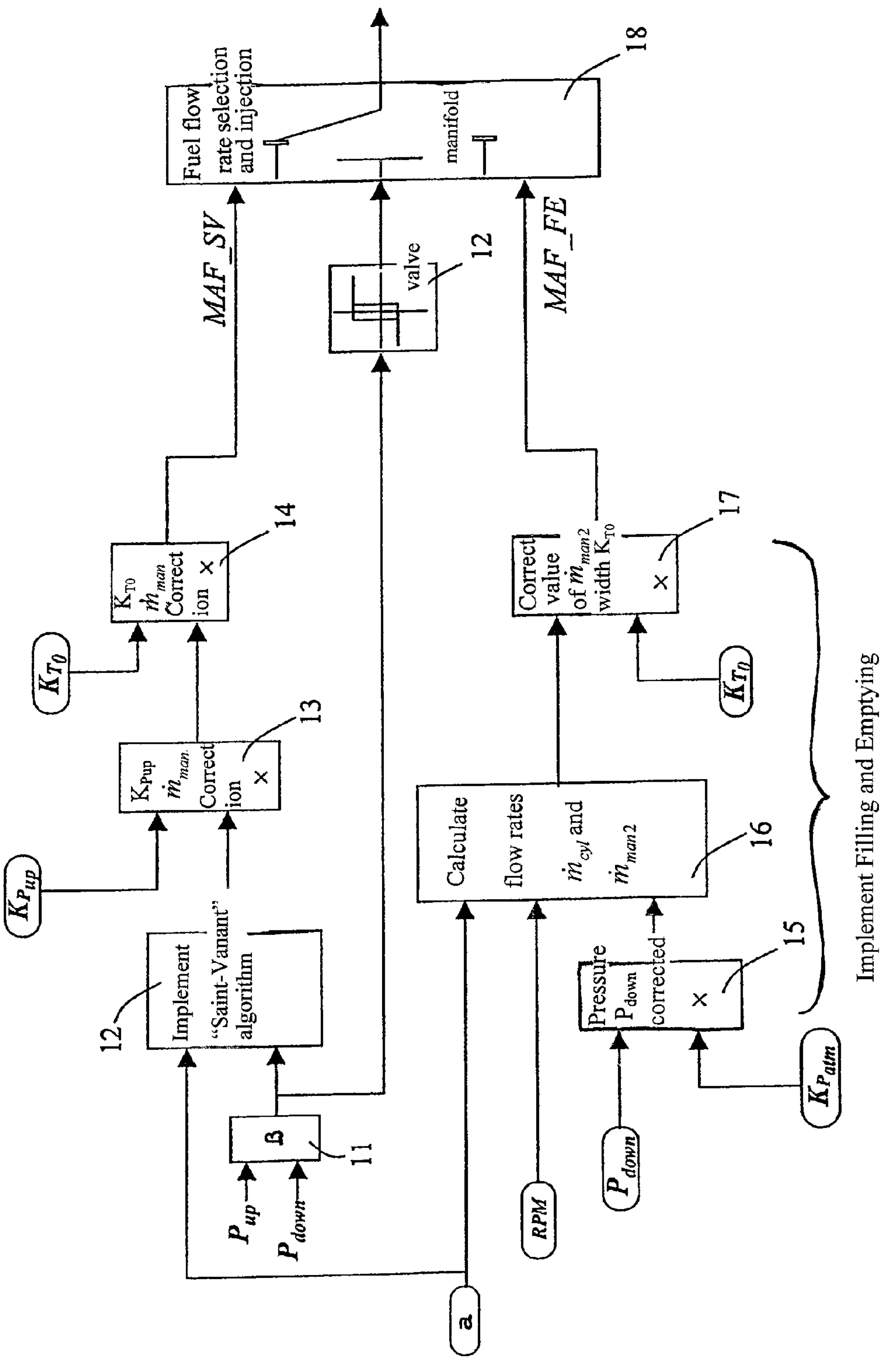
FIG. 2 is a functional flow diagram of the method for estimating the intake air flow rate in an internal combustion engine according to the present invention.

The electronic control system 3 comprises: a temperature sensor 7, arranged at the inlet of the air intake conduit 4 and producing an electric output signal indicative of the temperature $T_0$ of the intake air at the inlet of the intake conduit 4; a pressure sensor 8 arranged upstream of the throttle valve 6 and producing an electric output signal indicative of the pressure $P_{up}$ of the air at the inlet of the throttle valve 6, a pressure sensor 9 arranged downstream of the throttle valve 6 and producing an electric output signal indicative of the pressure $P_{down}$ of the air at the outlet of the throttle valve 6; a device for detecting the opening angle $\alpha$ of the throttle valve 6, for example a pair of potentiometers (not illustrated in the drawing); a device for measuring the engine speed RPM (not illustrated in the drawing); and an electronic control unit 10 connected to the temperature sensor 7, to the pressure sensors 8 and 9, to the engine speed RPM measuring device and to the actuating device for operating the throttle valve 6, producing output control signals for the engine 1 and configured to implement the method for estimating the intake air flow rate, according to the present invention described below with reference to the functional flow diagram in FIG. 2.

In particular, in an initial system calibration phase, a plurality of correction coefficients, which are necessary in order to implement the method for estimating the intake air flow rate, are stored in the electronic control unit 10, and in particular:

- a non-linear correction coefficient $K_{TO}$, as a function of the intake air temperature;
- a multiplicative correction coefficient $K_{Pup}$ as a function of the air pressure at the inlet of the throttle valve 6;
- a first table, not shown in FIG. 2, containing a plurality of values for the opening angle $\alpha$ of the throttle valve 6 as a function of the engine speed RPM; a second table, not shown in FIG. 2, containing a plurality of values for the air pressure drop $\beta$ between the outlet and the inlet of the throttle valve 6, as a function of the engine speed RPM; and a third table, not shown in FIG. 2, containing a plurality of leakage coefficients $C_1$ for the throttle valve 6, each determined experimentally as a function of a given value of the opening angle α of the throttle valve 6 and of a given pressure drop value β.

A reference value $\beta_{ref}$ is also stored in the electronic control unit 10, said value being indicative of the air pressure drop between the outlet and the inlet of the throttle valve 6 when the air flowing through the narrowest portion of the air intake conduit 4 reaches the speed of sound, equal to 0.5283, a pressure drop threshold value $\beta_{tsh}$, for example between 0.9 and 0.95, and a constant γ relating to the ratio between the specific heat of the air at constant pressure and that at constant volume, equal to 1.4.

In order to implement the method according to the present invention, the control unit 10 continuously acquires the following values measured by the various sensors listed above, namely:

the temperature $T_0$ of the intake air;

the pressure $P_{up}$ of the air at the inlet of the throttle valve 6;

the pressure $P_{down}$ of the air at the outlet of the throttle valve 6; and the engine speed RPM.

On the basis of the acquired values, the coefficients and the measurements in the stored tables, again with reference to FIG. 2, the electronic control unit 10 implements two different algorithms, each suitable to calculate an engine intake air flow rate.

The electronic control unit 10 selects one of the two air flow rates on the basis of a previously defined valuation criterion, and uses the selected value to calculate the fuel flow rate to be injected into the engine cylinders.

In particular, as illustrated in FIG. 2, in the block 11, the electronic control unit 10 calculates the ratio $P_{down}/P_{up}$, which equals the air pressure drop β between the outlet and the inlet of the throttle valve 6 and, on the basis of the pressure drop β and the opening angle α of the throttle valve 6, in the block 12 it implements an algorithm according to a mathematical model known as the "Saint-Venant" equation, which is described in detail in the following documents: "Integrated breathing model and multi-variable control approach for air management in advanced gasoline engine", by A. Miotti, R. Scattolini, A. Musi and C. Siviero, SAE 2006 World Congress, Detroit, Mich., USA, Apr. 3-6, 2006, paper No. 2006-01-0658; and "Internal Combustion Engine Fundamentals" by J. B. Heywood, 1st ed., Mc Graw-Hill, Inc., New York, USA, 1988.

As is known, the Saint-Venant equation describes the flow rate of a fluid through a nozzle and can thus be used to determine the instantaneous mass of air entering the manifold and flowing through the throttle valve 6.

In the specific case, for that purpose, the electronic control unit 10 calculates a sonic factor $f_s$ as a function of the pressure drop β and the constant γ, according to the following formula:

$$f_s(\beta) = \begin{cases} \gamma^{1/2}\cdot\left(\dfrac{2}{\gamma+1}\right)^{(\gamma+1)/2(\gamma-1)} = 0.6847, & \text{if } \beta < 0.5283; \\ \beta^{1/r}\cdot\sqrt{\dfrac{2\gamma}{\gamma-1}(1-\beta^{(\gamma-1)/\gamma})}, & \text{if } \beta > 0.5283; \end{cases}$$

Next, the electronic control unit 10 calculates the Saint-Venant equation according to the following formula:

$$\dot{m}_{man1} = p_{up}\cdot\sqrt{\frac{M}{R\cdot T_0}}\cdot C_1(\alpha,\beta)\cdot A_{eq}(\alpha)\cdot f_s(\beta)$$

where:

$\dot{m}_{man1}$ is the instantaneous mass of air entering the manifold;

M is the molecular weight of the air;

R is the gas specific constant:

$C_1$ is the leakage coefficient;

$A_{eq}$ is the total equivalent area of the throttle valve section through which the air flows;

$f_s$ is the sonic factor.

The Saint-Venant equation can be used to obtain a precise estimation of the intake air mass, regardless of any possible mechanical timing errors and sudden intake timing variations, but provided the pressure ratio β at the throttle valve is lower than a threshold value, typically in the region of 0.9.

In the blocks 13 and 14, the electronic control unit 10 corrects the air mass value $\dot{m}_{man}$ calculated in the block 12 using the correction coefficients $K_{Pup}$ and $K_{T0}$, and at the output of the block 14 it provides the instantaneous mass of air MAF_SV entering the manifold 4.

Parallel to the procedure described in the blocks 11-14, in the blocks 15-17 the electronic control unit 10 implements another algorithm based on the so-called "Filling & Emptying" model, suitable to determine the air flowing into the engine cylinders as a function of the opening of the throttle valve 6 and the engine speed RPM, described in detail in documents: "Engine air-fuel ratio and torque control using secondary throttles", Proceedings of IEEE Conference on Decision and Control, by A. G. Stefanopoulou, J. W. Grizzle and J. S. Freudenberg, Orlando, USA, 1994, pages 2748-2753; and "Internal Combustion Engine Fundamentals", 1st ed., J. B. Heywood, Mc Graw-Hill, Inc., New York, USA, 1988.

In particular, for that purpose, the electronic control unit 10 first calculates a correction coefficient $K_{Patm}$, for the pressure $P_{down}$ of the air at the outlet of the throttle valve 6 according to the following formula:

$$K_{Patm} = \frac{p_{rif}}{p_{atm}}$$

where $P_{rif}$ is a reference atmospheric pressure and $P_{atm}$ is the atmospheric pressure, which can be measured, for example, by a specific sensor incorporated in the electronic control unit 10.

Next, in the block 15, the electronic control unit 10 corrects the pressure $P_{down}$ using the correction coefficient $K_{Patm}$, and, on the basis of the opening angle α of the throttle valve 6 and the corrected pressure value $P_{down}$ and engine speed RPM, in the block 16 it calculates the flow rate $\dot{m}_{cyl}$ of the air entering each engine cylinder, and the flow rate $\dot{m}_{man2}$ of the air flowing through the manifold 4 according to the following formulas:

$$\frac{d\,p_{down}}{dt} = \frac{R\cdot T_0}{M\cdot V_0}\cdot\left(p_{up}\cdot\sqrt{\frac{M}{R\cdot T_0}}\cdot f(\alpha)\cdot g(\beta) - \frac{RPM\cdot V_{cyl}\cdot M\cdot\eta_{vol}}{120\cdot R\cdot T_0}\cdot p_{down}\right)$$

-continued $$\dot{m}_{cyl} = \frac{N \cdot V_{cyl} \cdot M \cdot \eta_{vol}}{120 \cdot R \cdot T_0} \cdot p_{down}$$

$$\frac{dp}{dt} = \frac{R \cdot T_0}{M \cdot V_0} \cdot (\dot{m}_{man2} - \dot{m}_{cyl1})$$

where:

$T_0$ is the intake air temperature;

$V_0$ is the intake manifold volume;

$V_{cyl}$ is the volume displaced by the piston in the cylinder;

RPM is the engine speed;

$\eta_{vol}$, is the volumetric efficiency of the engine;

f is a polynomial function obtained by multiplying the equivalent area Aeq by the portion of the leakage coefficient $C_1$, that depends solely on the angle $\alpha$ of the throttle valve 6; and g is a polynomial function obtained by multiplying the sonic factor $f_s$ by the portion of the leakage coefficient $C_1$ that depends solely on the pressure drop $\beta$.

The "Filling & Emptying" model can be used to determine the intake air taking into account the variations in the operating characteristics of the positive displacement pump when the engine speed changes. Said variations have a marked influence on the intake air mass flow rate, especially for pressure values $\beta$ of almost one.

The "Filling & Emptying" model can also be used to correctly reproduce the change in condition of the throttle valve "Drive-by-Wire" control, namely the transition from throttle valve control as a function of torque law (in which the throttle valve is controlled indirectly by the objective torque value calculated as a function of the request for power by the driver which is in turn calculated starting from the position of the accelerator pedal), to throttle valve control as a function of mechanical law (in which the throttle valve is controlled directly as a function of the position of the accelerator pedal).

In the block 17, the electronic control unit 10 corrects the value of the air flow rate $\dot{m}_{man}$ calculated in the block 16 using the correction coefficient $K_{TO}$ and, at the output of block 17 it provides the instantaneous mass of air MAF_FE entering the manifold 4.

As shown in FIG. 2, in the block 18 the electronic control unit 10 selects one of the mass air flow values MAF_SV and MAF_FE determined according to the algorithms described above and, in a subsequent phase that is not shown in FIG. 2, it uses the selected value to calculate the fuel flow rate to be injected into the engine cylinders.

In particular, the selection of one of the mass air flow values MAF_SV or MAF_FE is performed on the basis of the comparison between the current pressure drop $\beta$, determined in the block 11, and the previously defined pressure drop threshold value $\beta_{tsh}$.

In the specific case, the electronic control unit 10 selects the mass air flow MAF_SV estimated on the basis of the Saint-Venant equation if the current pressure drop $\beta$ is lower than the threshold value $\beta_{tsh}$, i.e. less than 0.9. If, instead, $\beta$ is greater than the threshold value $\beta_{tsh}$ i.e. more than 0.9 (except in case of a hysteresis, which can also be calibrated), the electronic control unit 10 selects the mass air flow MAF_FE estimated on the basis of the "Filling & Emptying" model.

The advantages that can be achieved with the present invention are apparent from an analysis of the characteristics thereof.

Firstly, thanks to the use of two different calculation algorithms and correction factors, the method according to the invention always allows the intake air flow rate to be estimated precisely, regardless of engine operating conditions and the pressure ratio $\beta$ at the throttle valve. Furthermore, by appropriately selecting the pressure drop threshold value $\beta_{tsh}$ the method according to the invention minimizes the overall mean square deviation of the estimation, for example with values of less than 2%, and achieves much lower error margins than the minimum error in measurements performed using an airflow meter.

Moreover, the method according to the invention is relatively simple to implement, in that it does not require numerical values for the coefficients, which are stored directly in the central control unit. The method according to the invention also eliminates the need for an airflow meter.

Lastly, from the above description and illustrations, it is clear that modifications and variations are possible without departing from the scope of the present invention as set forth in the appended claims.

Instead of the two pressure sensors arranged, respectively, upstream and downstream of the throttle valve, a single sensor can be used, for example, to directly detect the air pressure drop $\beta$ between the inlet and the outlet of the throttle valve.

The coefficients $K_{TO}$ $K_{Pup}$ can, alternatively, be recalculated each time by the electronic control unit 10 on the basis of the stored reference values.

In particular, it is clear that the present invention is not limited to use in an indirect injection petrol engine, and can be applied to any internal combustion engine provided with an air intake system.

The invention claimed is:

1. Method for estimating the intake air flow rate in an internal combustion engine to determine and control fuel flow rate to the engine, the engine being provided with an air intake system, said system comprising intake conduit and valve means for controlling the air flow rate flow to the intake conduit, wherein the method comprises the phases of:

implementing a first algorithm based on a "Saint-Venant model" and a second algorithm based on the "Filling and Emptying model" to determine respectively a first (MAF_SV) and a second (MAF_FE) intake mass air flow rate in said intake conduit;

selecting said first (MAF_SV) mass air flow rate in case the ratio ($\beta$) between the pressures ($P_{up}$, $P_{down}$) at the inlet and at the outlet of said valve means is lower than a previously defined threshold value ($\beta_{tsh}$) having a value between 0.9 and 0.95;

selecting said second (MAF_FE) mass air flow rate in case said ratio ($\beta$) between said pressures ($P_{up}$, $P_{down}$) at the inlet and at the outlet of said valve means is higher than said previously defined threshold value ($\beta_{tsh}$), wherein the selected first and second mass air flow rates are used to determine and control a proper fuel flow rate to the engine, wherein the mass air flow rate is determined by being mapped as a function of engine speed and valve means opening angle, and wherein determination of the air flow rate is based on an air pressure drop across the valve means, and controlling and supplying fuel to the engine at a proper fuel flow rate by using the selected first and second mass air flow rates.

2. Method according to claim 1, wherein the implementation of said first algorithm comprises:

the determination of said ratio ($\beta$) between said pressures ($P_{up}$, $P_{down}$) at the inlet and at the outlet of said valve means;

the determination of an opening angle ($\alpha$) of said valve means; and the determination of said first intake air flow rate (MAF_SV) on the basis of said ratio (β) and of said opening angle (α) of said valve means.

3. Method according to claim 2, wherein said first mass air flow rate (MAF_SV) is determined on the basis of the following formula:

$$\dot{m}_{man1} = p_{up} \cdot \sqrt{\frac{M}{R \cdot T_0}} \cdot C_1(\alpha, \beta) \cdot A_{eq}(\alpha) \cdot f_s(\beta)$$

where:

$\dot{m}_{man1}$ is a first instantaneous mass of air entering an intake conduit that is part of said system;

M is the molecular weight of the air;

R is the gas specific constant;

$C_1$ is a leakage coefficient of said valve means;

$A_{eq}$ is an equivalent surface of the section of said valve means through which said intake air flows and $f_s$ is a factor indicative of said pressure ratio (β).

4. Method according to claim 3, wherein the implementation of said first algorithm also comprises:

the determination of at least a first correction factor ($K_{Pup}$, $K_{T0}$) of said pressure at the inlet of said valve means ($P_{up}$), and/or of a temperature ($T_0$) of said intake air; and the determination of said first mass air flow rate (MAF_SV) on the basis of said first correction factor ($K_{Pup}$, $K_{TO}$) and of said first instantaneous mass of intake air ($\dot{m}_{man1}$).

5. Method according to claim 1, wherein the implementation of said second algorithm comprises:

the determination of said opening angle (α) of said valve means;

the determination of a speed (RPM) of said engine; and the determination of said second intake mass air flow rate (MAF_FE) on the basis of said pressure ($P_{down}$) at the outlet of said valve means, of said opening angle (α) of said valve means and of said speed (RPM) of said engine.

6. Method according to claim 5, wherein the implementation of said second algorithm also comprises:

the determination of at least a second correction factor ($K_{Pdown}$) of said pressure ($P_{down}$) at the outlet of said valve means;

the correction of said pressure ($P_{down}$) at the outlet of said valve means using said second correction factor ($K_{Pdown}$); and the determination of said second (MAF_FE) intake mass air flow rate, on the basis of said pressure ($P_{down}$) at the outlet of said valve means corrected using said second correction factor ($K_{Pdown}$), of said opening angle (α) of said valve means, and of said speed (RPM) of said engine.

7. A non-transitory computer readable medium bearing a computer program for loading into the memory of a digital processor, said computer program comprising portions of software codes that are capable of implementing the method according to claim 1 when said computer program is run on said digital processor.

8. Internal combustion engine comprising an air intake system and a device configured to implement the method for estimating the intake air flow rate according to claim 1.

9. Method for estimating the intake air flow rate in an internal combustion engine provided with an air intake system to determine and control fuel flow rate to the engine, the engine being provided with an air intake system, said system comprising valve means for controlling said air flow rate, wherein the method comprises the phases of:

i) implementing a first and a second algorithm suitable to determine respectively a first (MAF_SV) and a second (MAF_FE) intake mass air flow rate in said engine; and ii) selecting said first (MAF_SV) or said second (MAF_FE) mass air flow rate, on the basis of a previously defined selection criterion, wherein the implementation of said second algorithm comprises:

the determination of said opening angle (α) of said valve means;

the determination of a speed (RPM) of said engine; and the determination of said second intake air flow rate (MAF_FE) on the basis of said pressure ($P_{down}$) at the outlet of said valve means, of said opening angle (α) of said valve means and of said speed (RPM) of said engine, and wherein said second (MAF_FE) mass air flow rate is determined on the basis of the following formulas:

$$\frac{d\,p_{down}}{dt} = \frac{R \cdot T_0}{M \cdot V_0} \cdot \left( p_{up} \cdot \sqrt{\frac{M}{R \cdot T_0}} \cdot f(\alpha) \cdot g(\beta) - \frac{RPM \cdot V_{cyl} \cdot M \cdot \eta_{vol}}{120 \cdot R \cdot T_0} \cdot p_{down} \right)$$

$$\dot{m}_{cyl} = \frac{N \cdot V_{cyl} \cdot M \cdot \eta_{vol}}{120 \cdot R \cdot T_0} \cdot p_{down}, \quad \text{and}$$

$$\frac{dp}{dt} = \frac{R \cdot T_0}{M \cdot V_0} \cdot (\dot{m}_{man2} - \dot{m}_{cyl})$$

where:

$T_0$ is said intake air temperature;

$V_0$ is a volume of an intake conduit of said air, which is part of said system;

$V_{cyl}$ is a volume of a cylinder of said engine;

RPM is said engine speed;

$\eta_{vol}$ is a volumetric efficiency of said engine;

$\dot{m}_{cyl}$ is a mass of air entering said cylinder;

$\dot{m}_{man2}$ is a second mass of air entering said intake conduit;

f is a first value as a function of said equivalent surface ($A_{eq}$), of said leakage coefficient ($C_1$) and of said opening angle (α) of said valve means;

g is a second value as a function of said leakage coefficient ($C_1$), of said ratio (β) between said second ($P_{down}$) and said first pressure ($P_{up}$) and of said factor ($f_s$) indicative of said pressure ratio (β) wherein the first and second mass air flow rates are used to determine a proper fuel flow rate to the engine.

10. Method according to claim 9, wherein:

said first value (f) is determined by multiplying said equivalent surface ($A_{eg}$) by a first portion of said leakage coefficient ($C_1$) that depends solely on said opening angle of said valve means; and said second value (f) is determined by multiplying said factor ($f_s$) indicative of said pressure ratio (β) by a second portion of said leakage coefficient ($C_1$) that depends solely on said ratio (β) between said ($P_{down}$) and said first pressure ($P_{up}$).

11. Method according to claim 10, wherein the implementation of said second algorithm also comprises:

the determination of said second intake mass air flow rate (MAF_FE) on the basis of said correction factor ($K_{TO}$) of said temperature ($T_0$) and of said second intake air mass $\dot{m}_{man2}$.

12. A non-transitory computer readable medium bearing a computer program for loading into the memory of a digital processor, said computer program comprising portions of software codes that are capable of implementing the method according to claim 9 when said computer program is run on said digital processor.

13. Internal combustion engine comprising an air intake system and a device configured to implement the method for estimating the intake air flow rate according to claim 9.

* * * * *